(12) United States Patent
Onoue et al.

(10) Patent No.: US 6,208,104 B1
(45) Date of Patent: Mar. 27, 2001

(54) ROBOT CONTROL UNIT

(75) Inventors: Kazuhiko Onoue, Kobe; Takahiro Ueno, Akashi; Masataka Koyama, Hyogo-Ken; Nobuyasu Shimomura, Kobe, all of (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 0 days.

(21) Appl. No.: 09/423,556

(22) PCT Filed: May 12, 1998

(86) PCT No.: PCT/JP98/02092

§ 371 Date: Nov. 10, 1999

§ 102(e) Date: Nov. 10, 1999

(87) PCT Pub. No.: WO98/51456

PCT Pub. Date: Nov. 19, 1998

(30) Foreign Application Priority Data

May 12, 1997 (JP) .................................................. 9-121342

(51) Int. Cl.[7] .................................................. B25J 9/18
(52) U.S. Cl. .................................. 318/568.11; 318/568.1; 318/568.2; 318/567; 901/6; 901/15

(58) Field of Search ............................ 318/567, 568.1, 318/568.2, 568.11; 395/571, 580; 700/245, 249; 901/6, 15

(56) References Cited

U.S. PATENT DOCUMENTS 5,872,962 * 2/1999 Hisanaga et al. .................... 395/571
6,005,590 * 12/1999 Negishi et al. ...................... 318/567

FOREIGN PATENT DOCUMENTS 4-134501 5/1992 (JP) .
4-250503 9/1992 (JP) .
5-46225 2/1993 (JP) .

* cited by examiner

*Primary Examiner*—Karen Masih
(74) *Attorney, Agent, or Firm*—Oliff & Berridge, PLC

(57) ABSTRACT

An element including a first processing circuit conducting a real time processes for controlling a robot body and a man-machine interface element including a second processing circuit for operating the robot body are connected through the common storage device. It enables for application programs that can run with a general OS to easily refer to data relating to the robot. It also enables to easily construct necessary software.

10 Claims, 15 Drawing Sheets

| ENCODER VALUES OF JOINTS |
|---|
| TRANSFORMATION MATRIX |
| REFERENCE VALUES FOR JOINTS |
| DEVIATION VALUES FOR JOINTS |
| SPEED REFERENCE VALUES OF JOINTS |
| PRESENT SPEEDS OF JOINTS |
| PRESENT CURRENT VALUES OF JOINTS |
| ROBOT PROGRAM INFORMATION |

FIG. 9

| SWITCHING DATA FOR TEACHING/REPEATING |
|---|
| SWITCHING DATA FOR HOLDING/RUNNING |
| DATA FOR A CYCLE START |
| SWITCHING DATA FOR A MOTOR SOURCE |
| DATA FOR A ERROR RESET |
| DATA FOR AN EMERGENCY STOP |

FIG. 11

ROBOT CONTROL UNIT

BACKGROUND OF THE INVENTION

1. Field of the Invention

This invention relates to a novel robot control unit into which a user can easily assemble an application program for a robot body having a plurality of joints.

2. Description of the Related Art

Conventional robot control units consist of systems unified robot controlling means with man-machine interface means. Thus, it is difficult for a robot body to execute various functions that are suitable for a user. Even if the robot body can execute some functions, the functions would be limited by a manufacturer of the conventional robot control unit for the robot body. There is also a problem that many steps and long term are necessary for development and achievement of the functions.

In addition, connecting personal computers via a serial circuit with an interface such as an RS232C can achieve only limited functions that are suitable for the user, because, for example a communication rate and a data volume are limited.

SUMMARY OF THE INVENTION

Therefore, an object of this invention is to provide a robot control unit which can easily achieve various functions that are suitable for a user.

This invention is a robot control unit for controlling a robot body with a plurality of joints, comprising; a servo unit for respectively driving the joints of the robot body, in response to an instructing signal: a common storage device for storing instruction data: a first processing circuit for reading the instruction data stored in the common storage device, and for sending the data to the servo-unit as the instructing signal: inputting means for making the instruction data for respectively driving the joints of the robot body by an inputting operation: and a second processing circuit for causing the instruction data from the inputting means to be stored into the common storage device.

One feature of the invention is connecting a real time processing element for controlling the robot body with a man-machine interface element for operating the robot body through the common storage device which can be used for a high-speed data communication (for example, 100M byte/sec). To put it simply, the robot control unit is constructed in a unified manner. Thus, it enables for application programs that can run with a general OS (Operating System) such as a WINDOWS to easily refer to data relating to the robot. In addition, it may be more convenient for end users to use the unit by using some graphical user interfaces or communication functions together. This invention may also provide some functions for easily constructing necessary software. Therefore, this invention can solve the problems in the prior art.

This invention also enables to control a plurality of robots and to monitor moving states of the robots, for example by connecting a robot controlling computer as a controlling means to a robot operating computer as an operating means and by transferring data between any two of the two computers and a common storage device. In addition, it may be connected to a remote operating computer with a network communication server, so that the remote-operating computer can achieve the same functions as the robot operating computer.

A robot controlling computer may consist of a robot controlling part for actually controlling a robot, and a data inputting-outputting (input-output) part (first processing circuit) for inputting and outputting data between the robot controlling part and a common storage device. A robot operating computer may consist of a man-machine interface (inputting means, second processing circuit), a data inputting-outputting part which can input and output data between a group of application software for monitoring movement of robot and the common storage device, and a network communication server which can input and output data between a computer connected to a network and the common storage device.

Alternatively, the robot control unit may consist of; a robot controlling computer as a first processing circuit or a controlling means, for a real time processing for respectively driving the joints of the robot body: a robot operating computer as a second processing circuit or an operating means, for serving as a man-machine interface for operating and monitoring the robot body: a common storage device such as a dual-port memory device which can be accessed at any time and at a high-rate, for example greater than 100M byte/s by each of the two computers: a servo unit: and inputting means for inputting instruction data such as a teaching pendant.

Both of the first and second processing circuits can read the instruction data from the common storage device, and write (store) the instruction data into the common storage device. Thus, a simpler construction and a higher processing speed can be achieved compared with the conventional construction where the first and second processing circuits have storage devices respectively.

Another feature of the invention is that the robot control unit further comprises: a servo communication interface connected to the servo unit, a first bus interface connected to the first processing circuit, and a second bus interface connected to the first bus interface, and is characterized that: the first processing circuit reads the instruction data stored in the common storage device, and sends the data to the servo-unit as the instructing signal through the servo communication interface, and the second processing circuit causes the instruction data from the inputting means to be stored into the common storage device through the second bus interface and the first bus interface.

According to the feature, a simpler construction can be achieved. A higher processing speed can be also achieved by the servo communication interface. The instruction data herein are for example, commands for respectively driving the joints of the robot body.

It is preferable that a robot controlling computer can output robot moving data and robot operating data into the common storage device at real time, and that a robot operating computer can switch the robot operating data. Thus, the robot operating computer can execute a robot operation. The robot moving data herein are detected data corresponding to moving state of the robot, for example, encoder values of the joints of the robot body, transformation matrix, reference values for the joints, speed reference values of the joint, present speeds of the joints, present current values of the joints, running programs, step numbers, or information of errors. The robot operating data herein are instruction data including commands necessary for operating the robot, for example, data for teaching/repeating, data for holding/running, data for a cycle start, data for a motor source, data for a error reset, or data for an emergency stop. The robot moving data and the robot operating data are inputted into or calculated inside the robot controlling computer.

Another feature of the invention is that the robot control unit further comprises; a first network communication interface connected to the second processing circuit, and network operating means having: network inputting means for making the instruction data for respectively driving the joints of the robot body by an inputting operation, a second network communication interface connected to the first network communication interface, and a third processing circuit for providing the instruction data from the network inputting means to the second processing circuit through the second network communication interface and the first network communication interface, and wherein; the second processing circuit causes the instruction data from the first network communication interface to be stored into the common storage device through the second bus interface and the first bus interface.

According to the feature, the second processing circuit as an operating means is connected to the third processing circuit or circuits of one or more said network operating means forming a network. The third processing circuit or circuits can write the instruction data into the common storage device through the second processing circuit.

That is, a plurality of remote operating computers connected to the network can be used to monitor the robot moving data and to operate the robot body by inputting or outputting the robot operating data, when a network communication server function is provided for the robot operating computer.

Another feature of the invention is that the robot control unit further comprises: detecting means for detecting a moving state of the robot body, and displaying means connected to the second processing circuit, for displaying detected data, and wherein: the first processing circuit causes the detected data by the detecting means to be stored into the common storage device through the servo communication interface, and the second processing circuit reads the detected data stored in the common storage device through the first bus interface and the second bus interface, and causes them to be displayed by the displaying means.

According to the feature, the detected data showing the moving state of the robot body can be read out from the common storage device by the second processing circuit, and be outputted on the displaying means, for example in a visual or auditory manner.

Another feature of the invention is that the robot control unit further comprises: detecting means for detecting a moving state of the robot body, and network displaying means connected to the third processing circuit, for displaying detected data, and wherein: the first processing circuit causes the detected data by the detecting means to be stored into the common storage device through the servo communication interface, the second processing circuit reads the detected data stored in the common storage device through the first bus interface and the second bus interface, and the third processing circuit receives the detected data read by the second processing circuit through the first network communication interface and the second network communication interface, and causes them to be displayed by the network displaying means.

According to the feature, the third processing circuit of the network operating means is connected to the displaying means, and the detected data stored in the common storage device can be displayed by the network displaying means.

Another feature of the invention is that the servo communication interface is connected to a plurality of servo units, and each of the servo units is separately connected to a robot body to drive it.

The joints such as robot arms of a plurality of robots can be controlled. For that purpose, for example, the robot operating computer is connected to a plurality of robot controlling computers through the common storage device, and the robot operating computer designates a number corresponding to a desired robot arm.

Another feature of the invention is that the instruction data inputted by the inputting means include the instruction data inputted by the network inputting means and other data.

A robot controlling computer can have an unrestricted outside command input function of receiving commands from outside without any restriction. In this case, commands for inputting or outputting robot moving programs, for inputting or outputting inside data and inside parameters, for controlling a start or a stop of moving robot, and for outputting accumulated error information or records of operating can be inputted from an inputting device (such as a keyboard, a touch panel or a mouse) through the common storage device. An outputting device of a robot operating computer (such as a liquid crystal screen or a cathode-ray tube CRT screen) can show a result of operating. The robot controlling computer can have a restricted outside command input function in addition to the unrestricted outside command input function provided at a reentrant. The outside command input and output functions (elements) connected to the robot operating computer through the common storage device can supply commands from application software run in the robot operating computer in order to control the robot. More than two commands from the application software in the robot operating computer may be exclusive each other. The restricted outside command input function may include restriction of commands that may have an effect on a normal movement of the robot system, such as commands for data writing, for data changing or for a start of the movement.

The restricted outside command input function of the robot operating computer may be executed by a plurality of the remote operating computers connected to the network when a network communication server function is provided in the robot operating computer.

Another feature of the invention is that teaching data can be inputted as the instruction data through the inputting means. In this case, the second processing circuit can store the teaching data into the common storage device.

According to the feature, teaching data for the joints of the robot body can be inputted through the inputting means connected to the second processing circuit. The inputting means can be for example a keyboard, or a combination of a picture shown on a liquid crystal screen or a cathode-ray tube screen for operating and a mouse for moving a cursor and for clicking to input. The teaching data can be stored in the common storage device, and be transferred to the servo unit by the first processing circuit to replay.

Another feature of the invention is that the robot body can move following the teaching data when the teaching data is inputted, and that the displaying means can display movement of the robot body following the inputted teaching data.

According to the feature, the robot body can move following the teaching data when the teaching data is inputted through the inputting means connected to the second processing circuit. Therefore, the teaching data can be confirmed or recorded by an operator.

The instruction data for operating the joints of the robot body can be inputted through the inputting means connected to the second processing circuit and the network inputting means connected to the third processing circuit included in the network operating means, and can be stored in the common storage device. Thus, the movement of the robot body can be remote operated. However, the instruction data can be inputted only through the inputting means connected to the second processing circuit, not through the network inputting means. In this case, a safer operation can be assured.

According to the feature, the teaching data can be inputted by the inputting means connected to the second processing circuit. Then, the displaying means connected to the second processing circuit such as a liquid crystal screen or a cathode-ray tube screen can output the detected data read from the common storage device by the second processing circuit, for example in a visual or auditory manner. This enables the teaching data to be recorded and written into the common storage device while being confirmed.

Another feature of the invention is that: the common storage device has a binary flag area for the instruction data corresponding to the instruction data, the second processing circuit causes the instruction data to be stored into the common storage device when the binary flag area for the instruction data is a predetermined logical value, and then changes the predetermined logical value of the binary flag area for the instruction data into the other logical value thereof, and the first processing circuit reads the instruction data corresponding to the logical value of the binary flag area for the instruction data when the binary flag area for the instruction data is the other logical value, and then changes the other logical value of the binary flag area for the instruction data into the predetermined logical value thereof.

According to the feature, the second processing circuit is allowed to write the instruction data newly after the instruction data in the common storage device is read by the first processing circuit.

Another feature of the invention is that: the common storage device has a binary flag area for the detection corresponding to the detected data, the second processing circuit causes the detected data to be stored into the common storage device when the binary flag area for the detection is a predetermined logical value, and then changes the predetermined logical value of the binary flag area for the detection into the other logical value thereof, and the first processing circuit reads the instruction data corresponding to the logical value of the binary flag area for the detection when the binary flag area for the detection is the other logical value, and then change the other logical value of the binary flag area for the detection into the predetermined logical value thereof.

According to the feature, the first processing circuit is allowed to write new detected data after the detected data in the common storage device is read out.

BRIEF DESCRIPTION OF THE DRAWINGS

FIG. 9 is a view showing contents stored in the common storage device 106 relating to an application program D;

FIG. 11 is a view showing contents stored in the common storage device 106 relating to the robot operating data shown in FIG. 10;

BEST MODE FOR CARRYING OUT THE INVENTION

Figure 1:
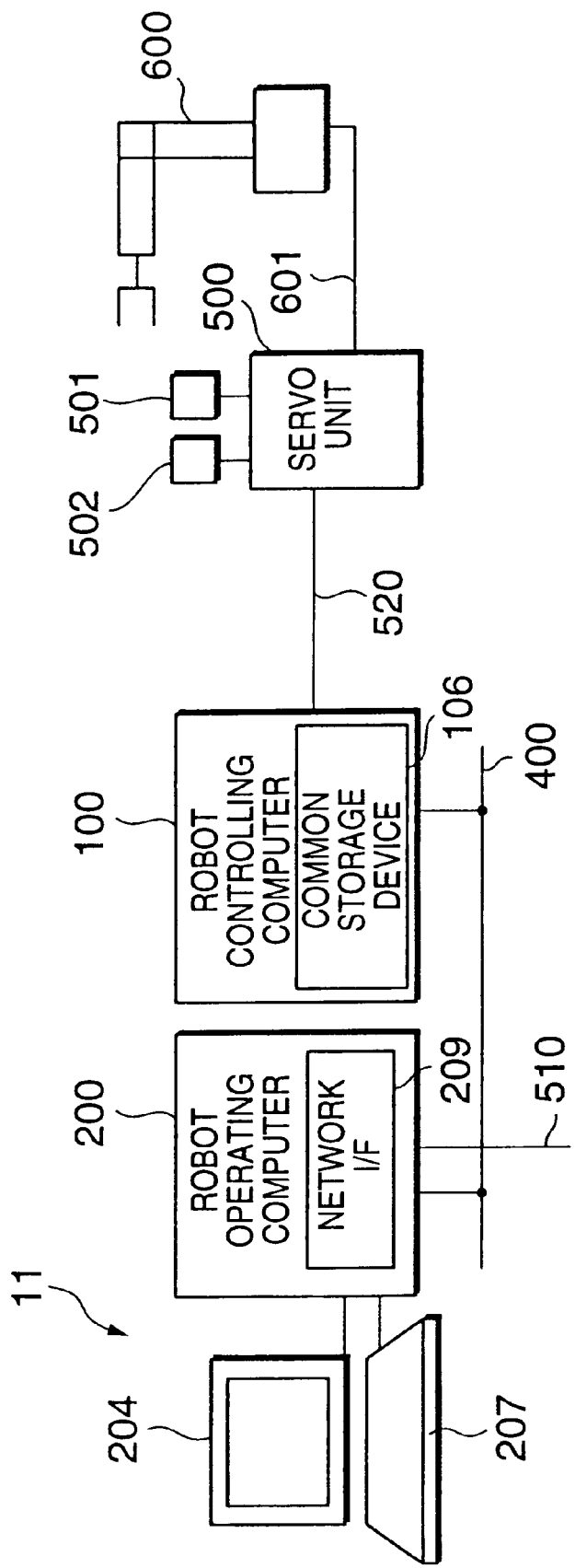
FIG. 1 is an entire schematic block diagram of an embodiment of the robot control unit of the invention.

FIG. 1 is an entire schematic block diagram of an embodiment of the robot control unit of the invention. Each joints of the robot body 600, which has a plurality of joints (six joints in this embodiment), is connected to an servo unit 500 through a line 601. The servo unit 500 is connected to a teach-inputting means 501, which is called a teaching pendant, and to an operating box 502. By operating the teach-inputting means 501, teaching data can be inputted, while the robot body 600 moves following the data. By operating the operating box 502, for example, a power of a motor can be switched on or off. The servo unit 500, the teach-inputting means 501 and the operating box 502 are disposed nearby the robot body 600. The servo unit 500 is connected to a controlling means 100 disposed in an office, through a line 520. The controlling means 100 is connected to an operating means 200 through a line 400. The operating means 200 is connected to a keyboard 207 as an inputting means, and to a displaying means 204 such as a liquid crystal screen or a cathode ray tube screen. The operating means 200, the keyboard 207 and the displaying means 204 may be materialized by a personal computer 11 on the market. The controlling means 100 can be set in a housing 12 of the personal computer 11.

Figure 2:
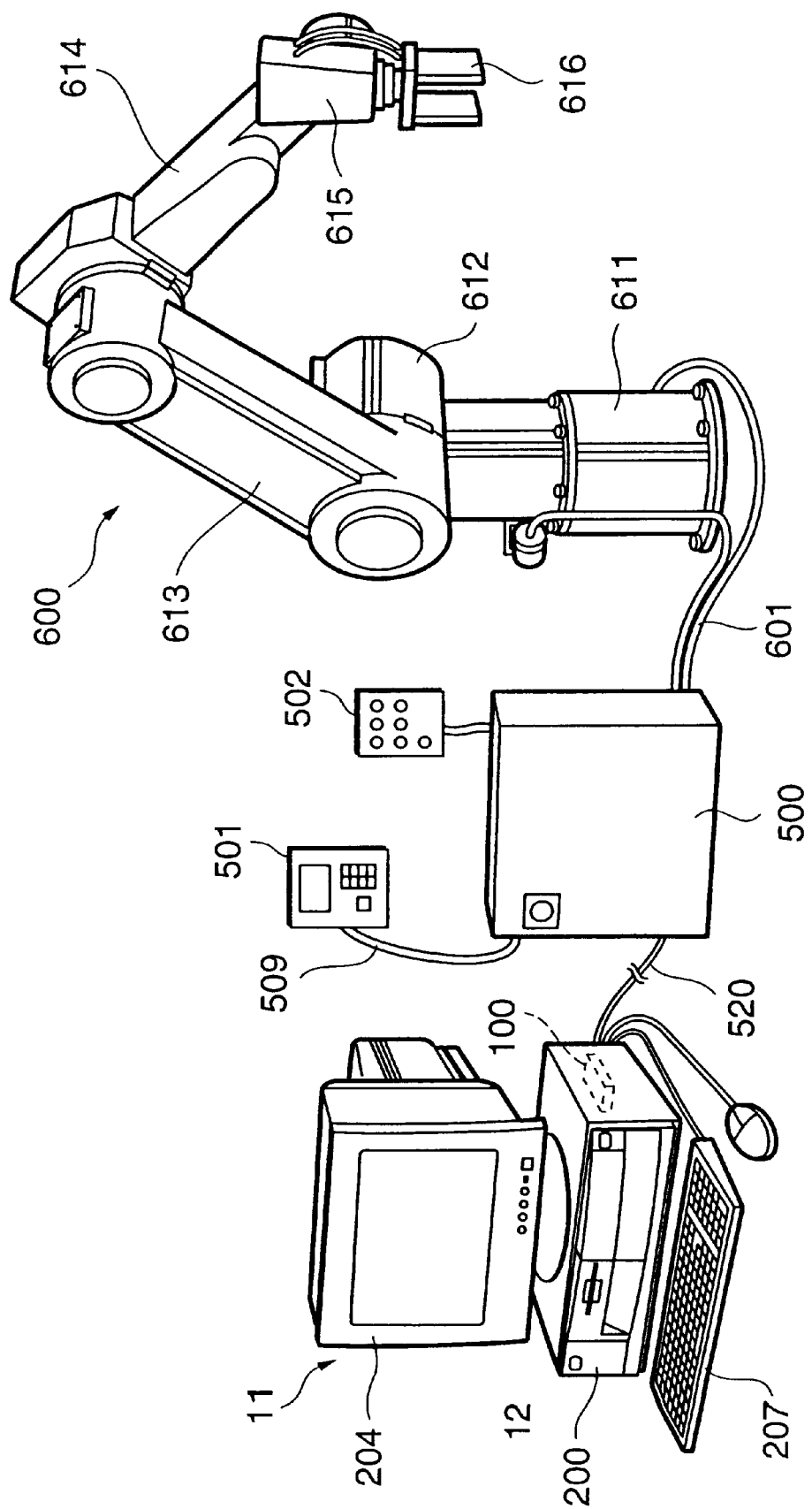
FIG. 2 is a perspective view of the robot control unit shown in FIG. 1.

FIG. 2 is a perspective view of the robot control unit shown in FIG. 1. The robot body 600 includes a pivoting body 612 on a fixed base-table 611, and arms 613, 614, 615 which can respectively rotate around joints thereof. Thus, a hand 616 can move to a desired point for a desired operation. The teach-inputting means 501 is connected to the servo unit 500 through a bendable line 509. Thus, an operator can input teaching data while handling the teach-inputting means 501 and confirming the moving state of the robot body 600 directly by his eyes.

According to the invention, the controlling means 100 which conduct real time processes for controlling the robot body 600 is separated from the operating means 200 as a man-machine interface element for operating the robot body. At the same time, the robot body 600 can move following application programs that can be run with a general OS. Thus, it may be more convenient for end users to use the unit by using some graphical user interfaces or communication functions together. This invention may also provide some functions for easily constructing necessary software.

Figure 3:
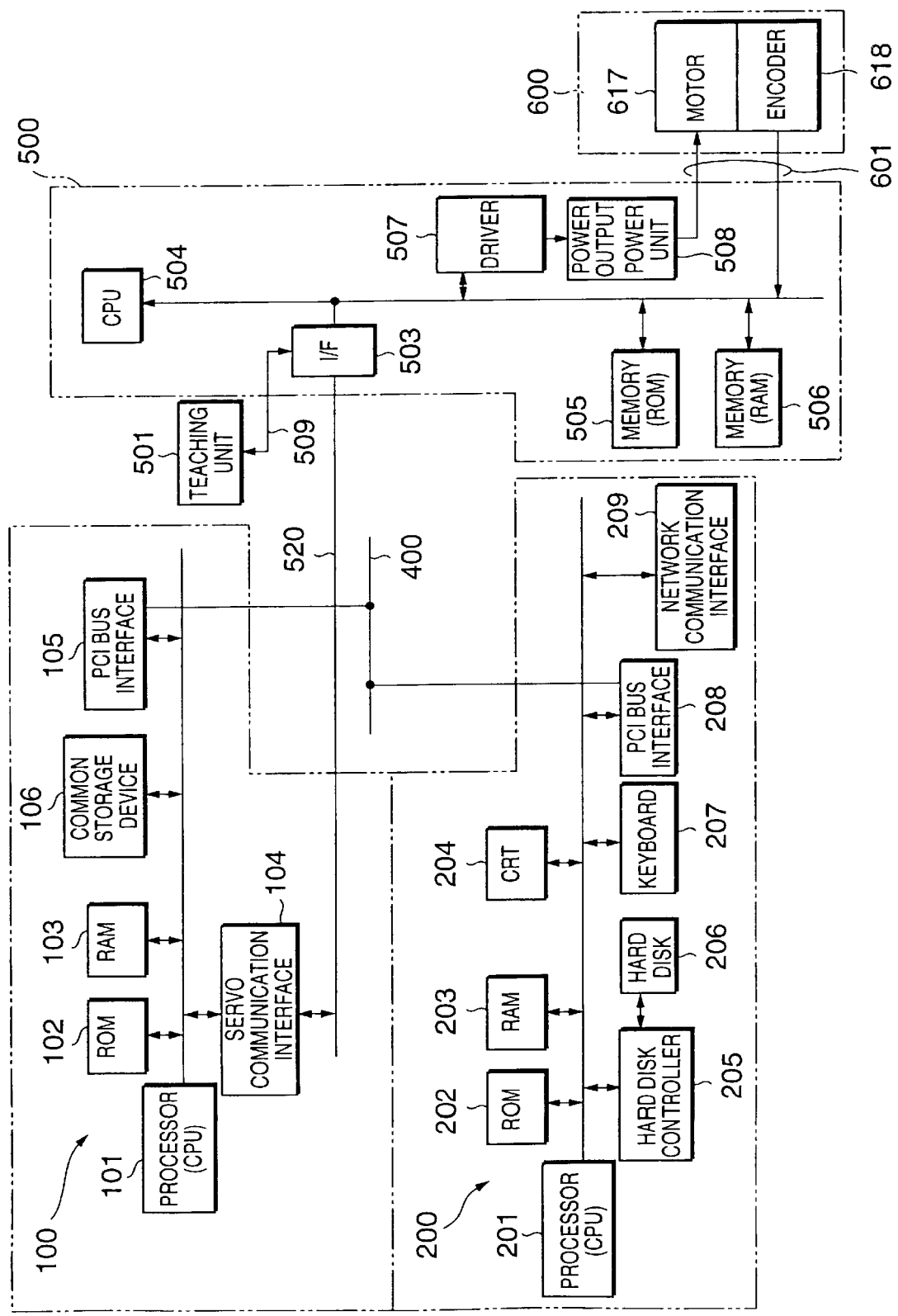
FIG. 3 is a block diagram showing an electrical structure of the embodiment shown in FIGS. 1 and 2.

FIG. 3 is a block diagram showing an electrical structure of the embodiment shown in FIGS. 1 and 2. Motors 617 are respectively mounted to the joints of the robot body 600. The positions of the joints, which are driven by the motors, are detected by encoders 618 (detecting means).

In the servo unit 500, the instruction signals from the line 520 are inputted into a processing circuit 504, which can be materialized by a micro computer or the like, through a servo communication interface 503. The processing circuit 504 is controlled by a program previously stored in a read-only-memory 505. The inputted instruction signals are stored in a random-access-memory 506. Thus, a driver for controlling power 507 drives a power output unit 508 to drive the motors 617 so that the positions of the joints are consistent with positions indicated by the instruction signals.

In the controlling means 100, a first processing circuit 101 which can be materialized by a micro computer or the like, is connected to a common storage device (memory) 106, a read-only-memory 102 and a random-access memory 103. Thus, the first processing circuit 101 can conduct various processes. The first processing circuit 101 is also connected to the servo communication interface 503 in the servo unit 500 through the line 520 by a servo communication interface 104. The first processing circuit 101 is also connected to the line 400 through a PCI bus interface 105. The first processing circuit 101 reads out the instruction data stored in the common storage device 106 and transmits (sends) the instruction signals to the servo unit 500 through the servo communication interface 104, 503. Detected data by the encoders 618 are transferred through the line 520 by the processing circuit 504 in the servo unit 500 and are stored in the common storage device 106 by the first processing circuit 101.

Regarding the operating means 200, a second processing circuit 201 which can be materialized by a micro computer or the like, is connected to a read-only-memory 202 and a random-access memory 203 as well as the keyboard 207 and the displaying means 204. In addition, a hard disk 206 is connected to the second processing circuit 201 through a hard disk controller 205. Thus, the second processing circuit 201 can conduct various processes following programs stored in the read-only-memory 202. The second processing circuit 201 is also connected to the line 400 through a PCI bus interface 208. That is, the second processing circuit 201 is also connected to the first processing circuit 101 through the PCI bus interface 105. Therefore, both of the first and second processing circuits 101, 201 can control the common storage device 106. In addition, the second processing circuit 201 is connected to a network communication interface 209.

Figure 4:
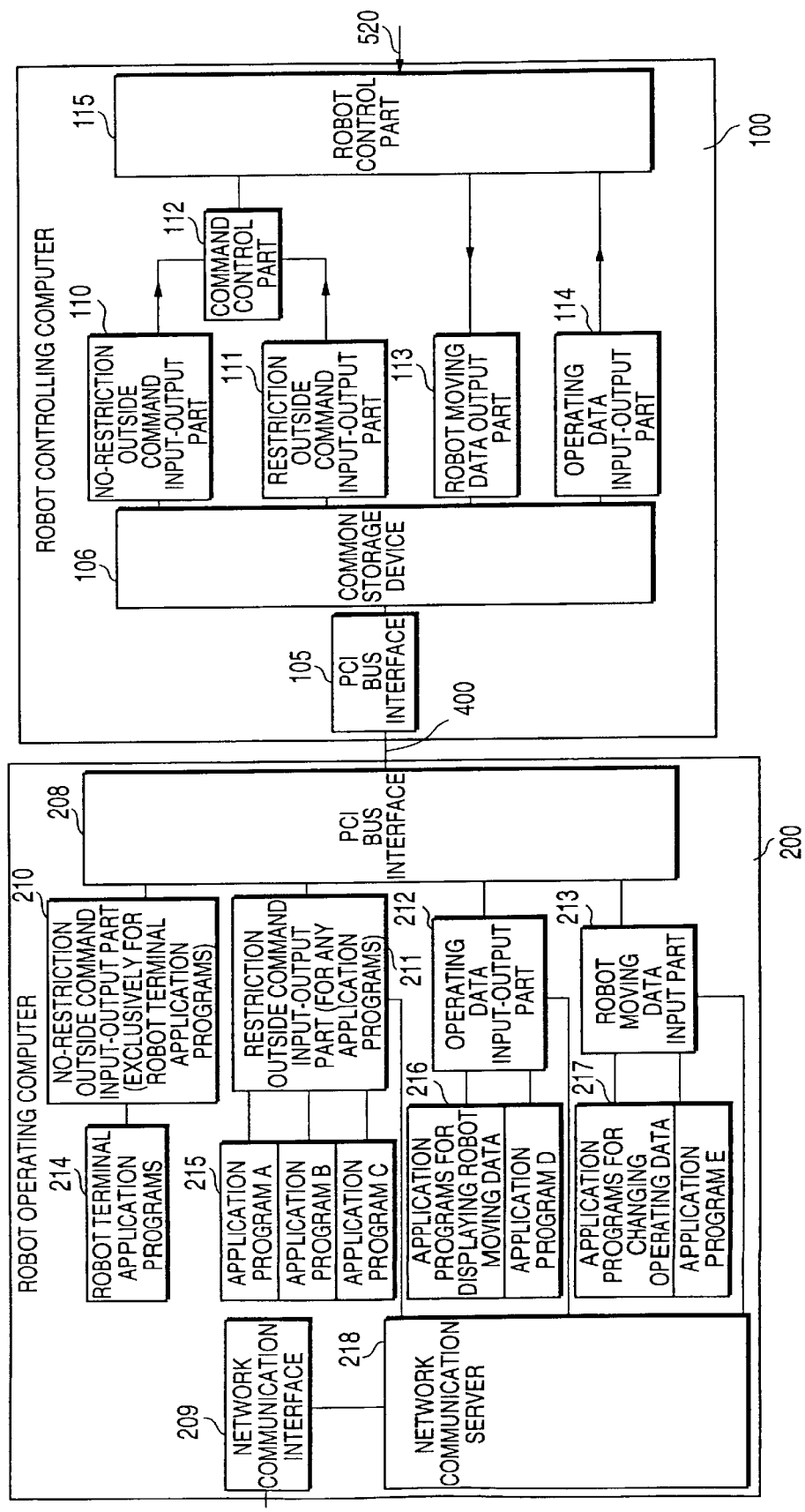
FIG. 4 is a block diagram showing a portion relating to the operation of the controlling means 100 and the operating means 200 shown in FIG. 3.

FIG. 4 is a block diagram showing a portion relating to the operation of the controlling means 100 and the operating means 200 shown in FIG. 3. The line 520 connected to the servo unit 500 is connected to a robot control part 115 in the controlling means 100. The detected data as robot moving data are sent from the encoders 618 to a moving data output part 113. The instruction data as operating data are provided from an input-output part 114. The output part 113 and the input-output part 114 are connected to the common storage device 106. A no-restriction outside command input-output part 110 and restriction outside command input-output part 111 are connected to the common storage device 106, and to the robot control part 115 through a command control part 112.

In the operating means 200, the PCI bus interface 208 is connected to a memory 214 where robot terminal application programs are stored, through a no-restriction outside command input-output part 210. A restriction outside command input-output part 211 is connected to a memory 215 where application programs A, B and C are stored. The no-restriction outside command input-output part 210 serves as an input-output part exclusively for the robot terminal application programs. The restriction outside command input-output part 211 serves for any application program which the user selects. In addition, the robot moving data input part 212 is connected to the PCI bus interface 208. The PCI bus interface 208 is connected to a memory 216 where application programs for displaying the robot moving data and other application programs D are stored. An operating data input-output part 213 is connected to a memory 217 where application programs for changing the operating data and other application programs E are stored. A network communication server 218 is connected to the restriction outside command input-output part 211, the robot moving data input part 212 and the operating data input-output part 213. The network communication server 218 is connected to a network communication interface 209.

Figure 5:
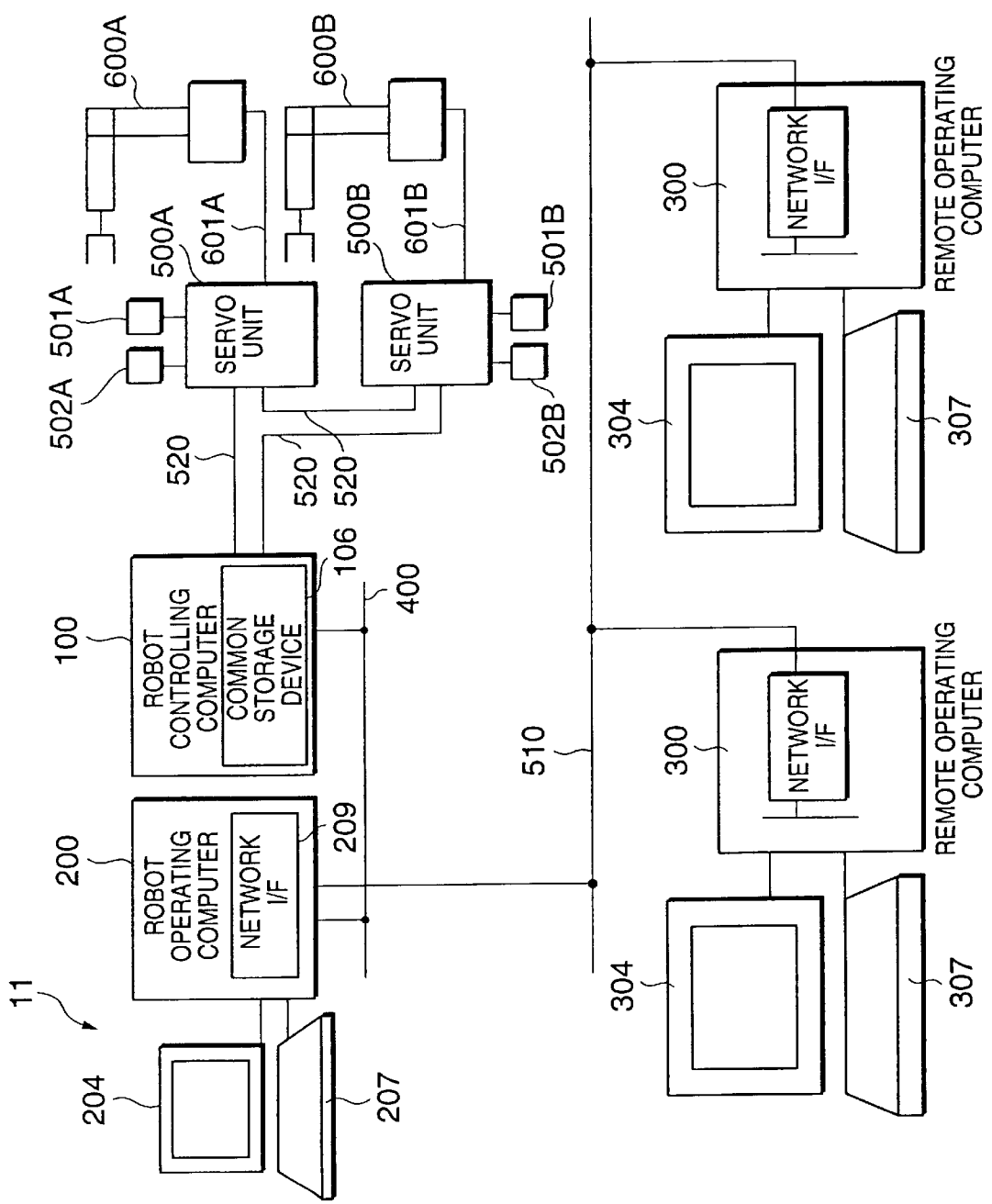
FIG. 5 is an entire schematic block diagram of another embodiment of the robot control unit of the invention.

FIG. 5 is an entire schematic block diagram of another embodiment of the robot control unit of the invention. This embodiment is similar to the above embodiment as shown in FIGS. 1 to 4, so that the same numerical signs are used for the corresponding elements in FIG. 5. A network communication interface 209 is connected to one or more (2 in FIG. 5) network operating means 300 through a line 510. The network operating means 300 is materialized by for example a remote operating computer with a keyboard 307 and a displaying means 304. The means 300 is also provided with a plurality of (2 in FIG. 5) robot bodies 600A, 600B. By operating the keyboard 207 of the operating means 200, the joints can be driven to alternatively operate the robot bodies 600A, 600B, the displaying means 204 can display the moving states of the robot bodies 600A, 600B for example in a manner as perspective views, and teach-input operations for the robot bodies 600A, 600B can be carried out. During the teach-input operations, the inputted data can be confirmed by seeing the displaying means 204 which displays the moving states of the robot bodies 600A, 600B. The robot bodies 600A, 600B can be operated by input operations to the keyboard 307 of the network operating means 300. The moving states of the robot bodies 600A, 600B can be displayed by the displaying means 304. However, teach-input operations for the robot bodies 600A, 600B cannot be carried out from the network operating means 300.

The controlling means 100 can control the robot bodies 600A, 600B.

Figure 6:
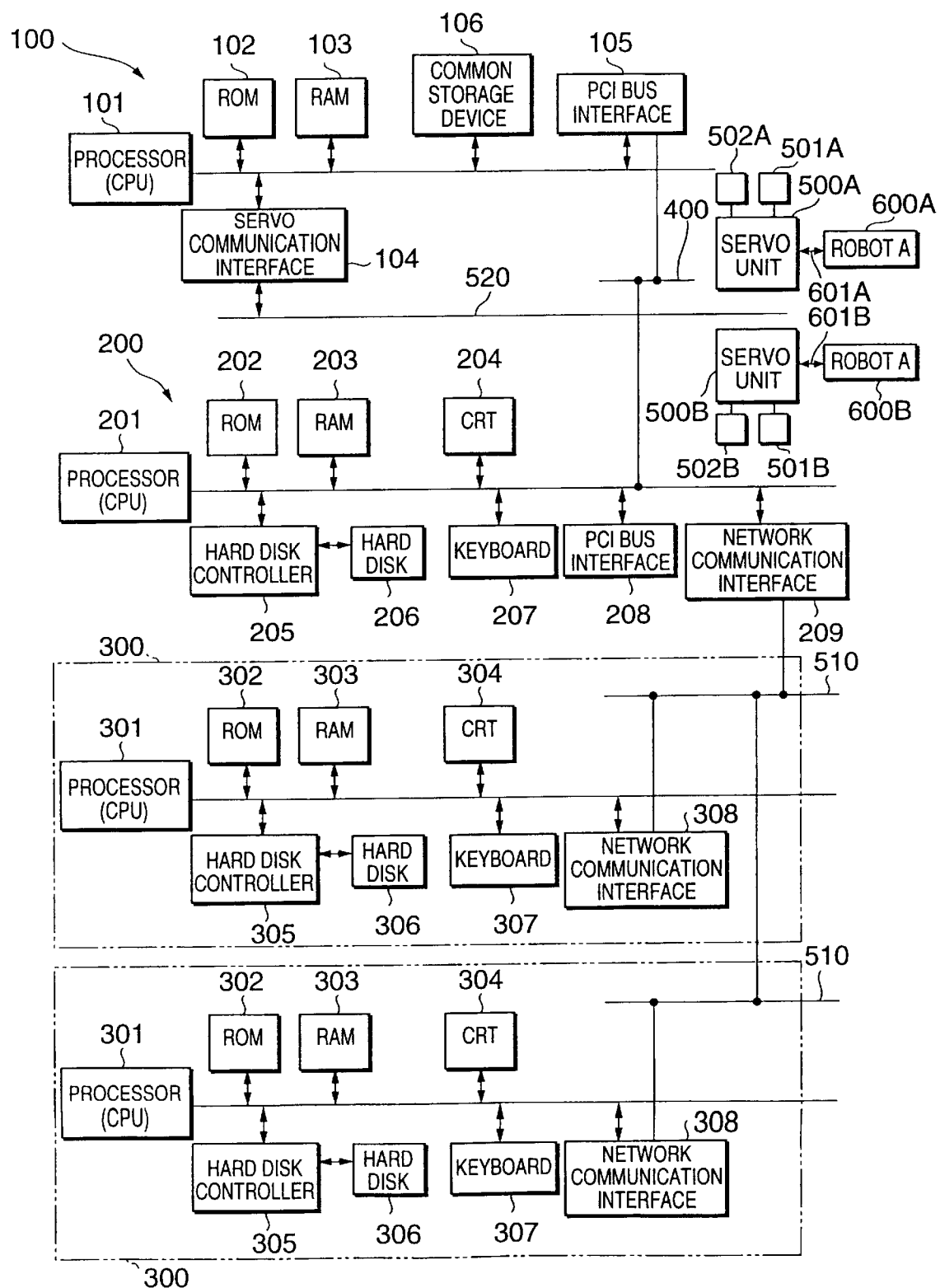
FIG. 6 is an entire block diagram of the embodiment shown in FIG. 5.
Figure 7:
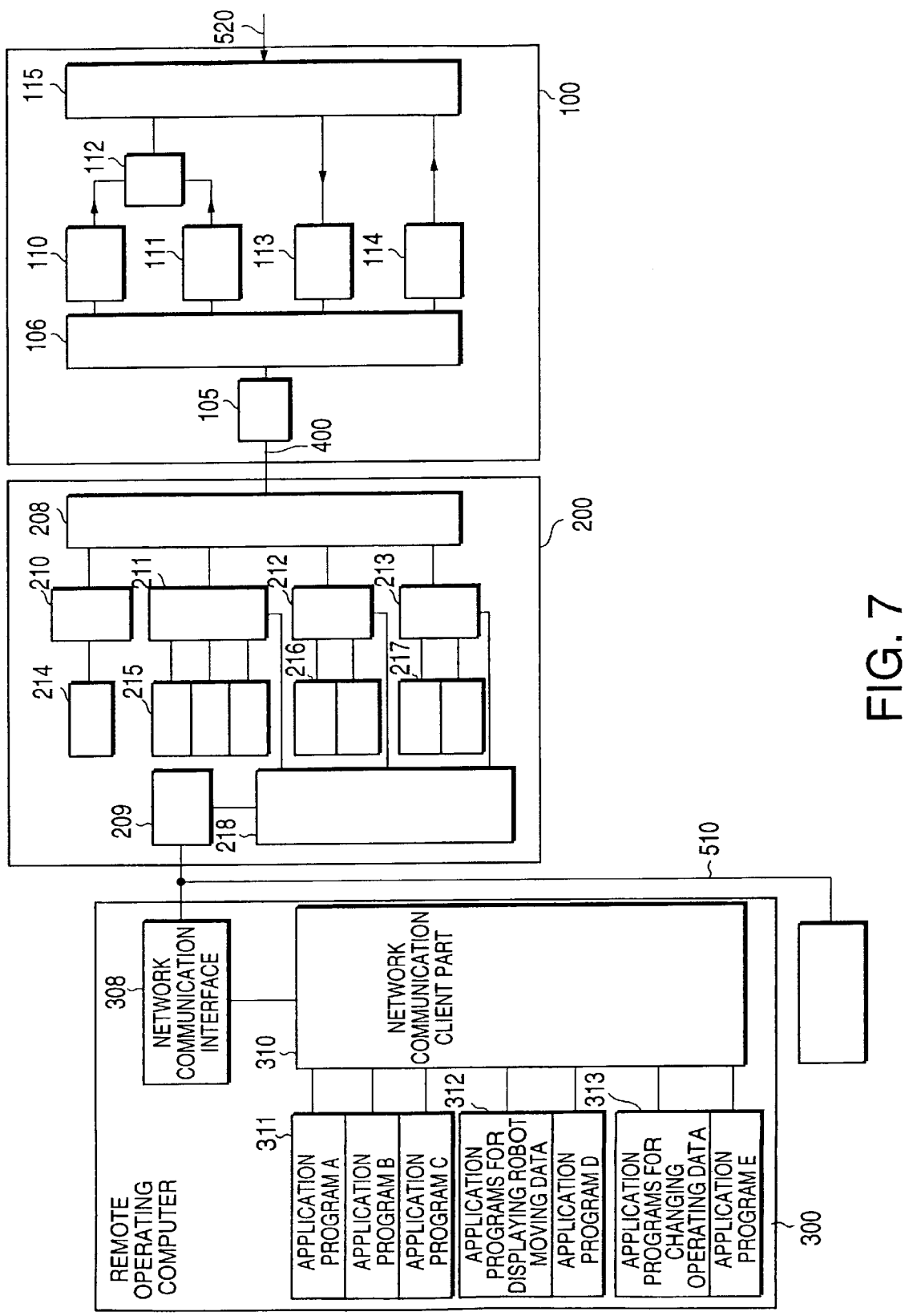
FIG. 7 is a block diagram mainly showing the operation of the embodiment shown in FIG. 5.

FIG. 6 is an entire block diagram of the embodiment shown in FIG. 5. FIG. 7 is a block diagram mainly showing the operation of the embodiment. The controlling means 100 can control the robot bodies 600A, 600B. The outside command input-output parts 100, 101, the robot moving data output part 113, and the operating data input-output part 114 are assigned to the robot bodies 600A, 600B, can transmit and receive various data to and from the common storage device 106 and the robot control part 115. The common storage device 106 is assigned for the plural robot bodies 600A, 600B. The outside command input-output parts 210, 211, the robot moving data input part 212, and the operating data input-output part 213 in the operating means 200 are also assigned to the robot bodies 600A, 600B, and are connected to the memories 214–217 where various application programs are stored, and can transmit and receive various data to and from the common storage device 106.

According to the embodiment, both of the controlling function of the plural robot bodies 600A, 600B and the network function are available. The operations can be carried out with the network operating means 300 the same as with the operating means 200. The controlling means 100 may have a compact command set for cheap and high-speed operations, the first processing circuit 101 which needs less overhead for interruptions, and the read-only-memory 102 and the random-access-memory 103 such as flash-memories. The controlling means 100 may also include a timer. Basic (master) software may be stored in the memory 102. The robot bodies 600A, 600B are controlled by system programs and robot programs.

In the operating means 200, tools for developing application software on the market are available. Thus, application program software that the user desires can be developed and used by operating the second processing circuit 201 by using the keyboard 207, the displaying means 204, the memories 202, 203. Thus, the robot bodies 600A, 600B can move for various functions.

The network operating means 300 has a network communication interface 308 connected to the line 510 and a network communication client part 310. The network communication client part 310 is connected to a memory 311 where the application programs A, B and C are stored, to a memory 312 where application programs for displaying the robot moving data and the application programs D are stored, and to a memory 313 where application programs for changing the operating data and the application programs E are stored. The no-restriction outside command input-output part 110, the restriction outside command input-output part 111, robot moving data output part 113 and the operating data input-output part 114, all of which are connected to the robot control part 115 and can transmit and receive the data to and from the common storage device 106, are connected to the operating means 200 through the common storage device 106, the PCI bus interface 105 and the line 400.

By using the PCI bus interface 208, the operating means 200 is accessible to various application programs, and can carry out a data input-output function to the common storage device 106 in the computer. The no-restriction outside command input-output part 210, the restriction outside command input-output part 211, robot moving data input part 212 and the operating data input-output part 213 are connected to the computer through the PCI bus interface 208. In the network operating means 300, various application programs are accessible from the network communication client part 310, and therefore from the operating means 200 and other network operating means 300 through the network communication interface 308. The operating means 200 has the network communication server 218 as described above. Thus, the operations can be carried out with the network operating means 300, which is connected to the network and is remotely operated, the same as with the operating means 200.

The network communication server 218 is connected to the network communication interface 209 including TCP/IP communication protocol techniques. Thus, the network communication server 218 can establish the communication to the plural network operating means 300 in the network. The network communication server 218 is also connected to the outside command input-output parts 210, 211, robot moving data input part 212 and the operating data input-output part 213 in the computer. Thus, the operations can be carried out with the network operating means 300 in the network the same as with the operating means 200.

Figure 8:
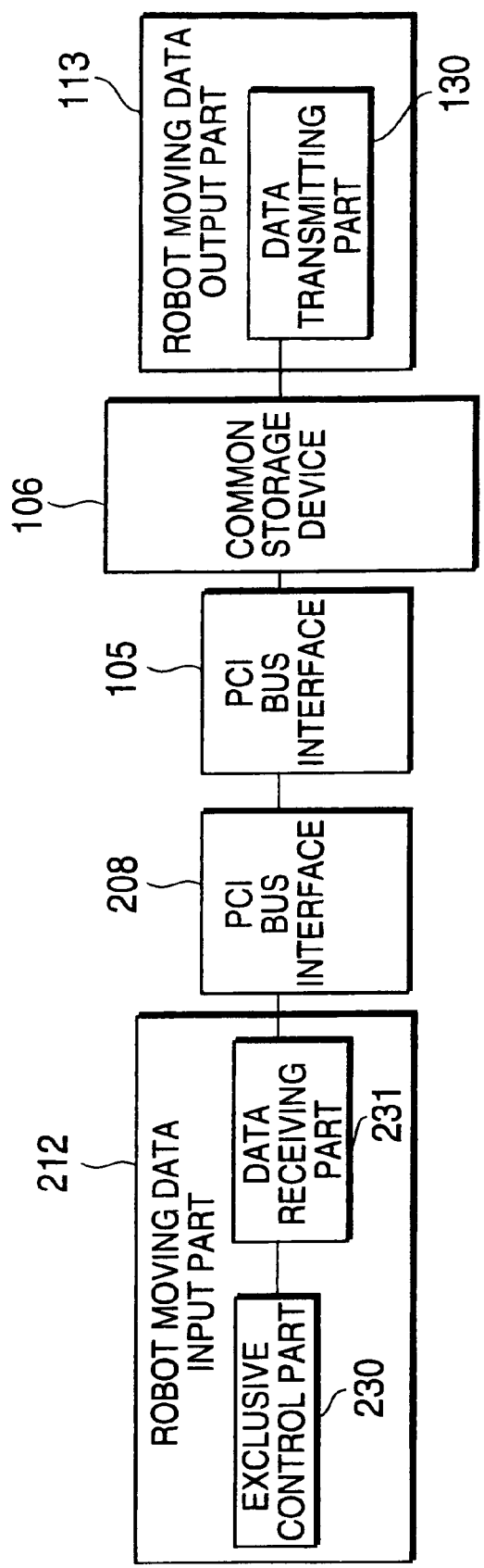
FIG. 8 is a schematic block diagram showing a portion relating to the robot moving data inputting and outputting element (input-output part) 212.

FIG. 8 is a schematic block diagram showing a portion relating to the robot moving data input-output part 212. FIG. 9 is a view showing contents stored in the common storage device 106 relating to an application program D. As shown in FIG. 8, the robot moving data input part 212 has a exclusive control part 230 which selects only one from the operating means 200 and the operating means 300, and a data receiving part 231. As shown in FIG. 9, the common storage device 106 is previously assigned for the robot moving data. The data receiving part 231 periodically reads out areas of the common storage device 106. A software developer can easily use the functions inside the data receiving part 231 while developing application software, because the functions are provided as an application programming interface. As shown in FIG. 9, the moving data as detected data include encoder values of the joints of each of the robot bodies 600A, 600B, transformation matrix, reference values for the joints, deviation values for the joints, speed reference values of the joints, present speeds of the joints, present current values in motors 617 of the joints, robot program information, or the like. The moving data are detected by the encoders 618 etc.

Figure 10:
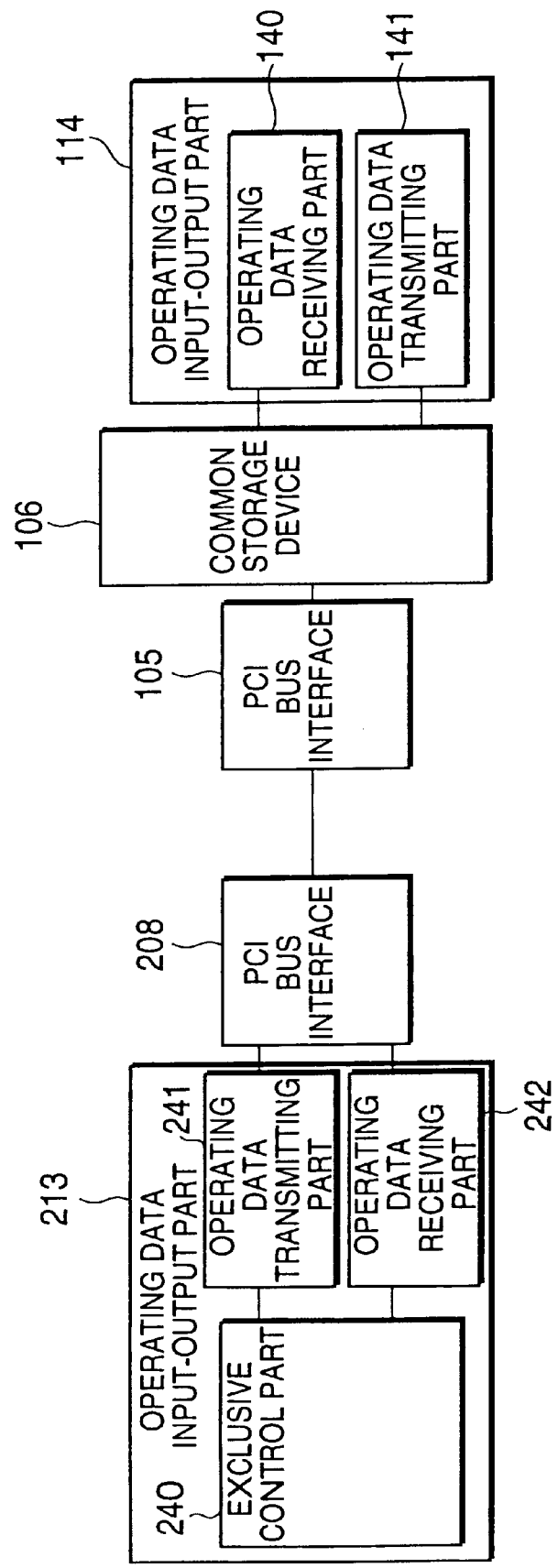
FIG. 10 is a schematic block diagram showing a portion relating to the robot operating data inputting and outputting element (input-output part) 213.

FIG. 10 is a schematic block diagram showing a portion relating to the operating data input-output part (element) 213. FIG. 11 is a view showing contents stored in the common storage device 106 relating to the operating data. The operating data input-output part 213 has a exclusive control part 240, a operating data transmitting part 241 and a operating data receiving part 242. The common storage device 106 is previously assigned for the instruction data that are given to the servo unit 500 as instruction signals that are operating data. As shown in FIG. 11, the instruction data include switching data for teaching/repeating, switching data for holding/running, data for a cycle start, switching data for a motor source, data for a error reset, data for an emergency stop or the like. As shown in FIG. 11, the operating data transmitting part 241 writes the switching data into the assigned areas of the common storage device 106. The operating data receiving part 242 periodically reads out the areas of the common storage device 106. A software developer can easily use the inside functions while developing application software, because the inside functions are provided as an application programming interface.

Figure 12:
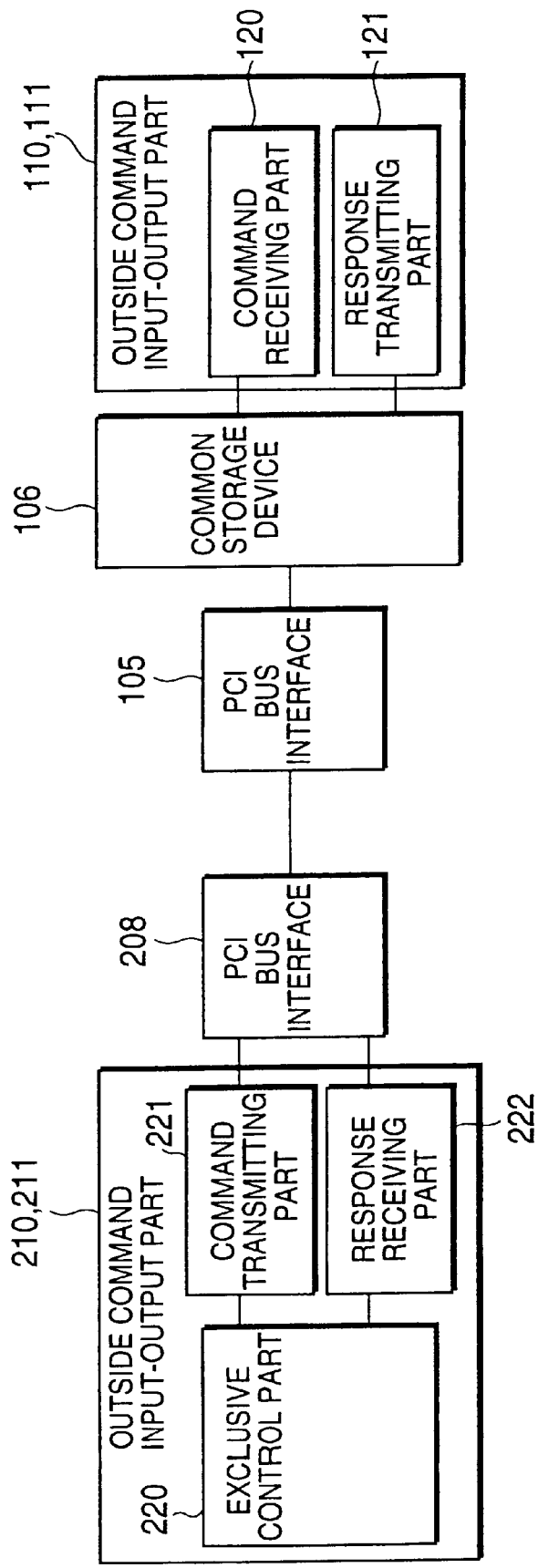
FIG. 12 is a block diagram showing a portion relating to the outside command inputting and outputting elements 210, 211; 110, 111.

FIG. 12 is a block diagram showing a portion relating to the outside command input-output parts (elements) 210, 211; 110, 111. Each of the no-restriction and restriction outside command input-output parts 210, 211 has a exclusive control part 220, a command transmitting part 221 and a response receiving part 222. Each of the no-restriction and restriction outside command input-output parts 110, 111 has a command receiving part 120 and a response transmitting part 121. The common storage device 106 has a command flag area, a command area, a response flag area, and a response area. A command is stored in the command area, and a flag corresponding to the command is stored in the command flag area. Response data are stored in the response area, and a flag corresponding to the response data is stored in the response flag area.

Figure 13:
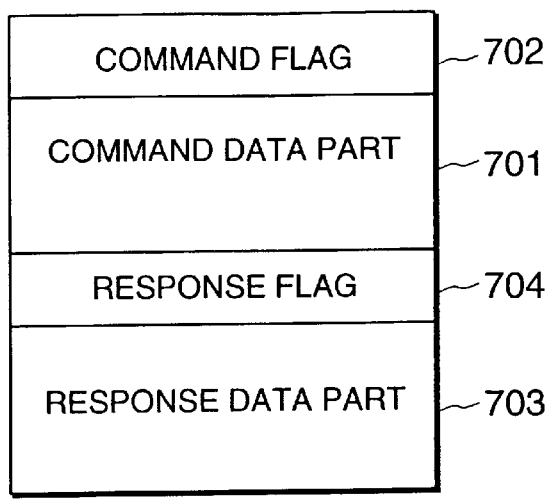
FIG. 13 is a view showing the structure of the common storage device 106.

FIG. 13 is a view showing the structure of the common storage device 106. A command flag area 702 (a binary flag area for the instruction data) is separately assigned corresponding to a command data part 701 for each of the plural commands. As described above, a flag is separately stored in a response flag area 704 (a binary flag area for the detected data) corresponding to each of the response data in the response area 703. In each of the flag areas 702, 704 is stored a binary logical value as a flag, that is, "1" or "0", following operations as shown in FIGS. 14 to 17. The no-restriction and restriction outside command input-output parts 110, 111 transmit commands for inputting or outputting the robot moving programs, for inputting or outputting inside data and inside parameters, for controlling a start or a stop of the robot body 600, for outputting accumulated error information or records of operating, to the controlling means 100, and receives a result of the execution as a response. As described in relation to the FIG. 9, the robot moving data output part 113 receives the detected data including encoder values of the joints of the robot body 600, transformation matrix, reference values for the joints, deviation values for the joints, speed reference values of the joints, present speeds of the joints, present current values in motors of the joints or the like, which are calculated or inputted in the controlling means 100. The robot moving data output part 113 also transmits them to the common storage device 106. The operating data input-output part 213 receives the data including commands for switching teaching/repeating, for switching holding/running, for a cycle start, for switching a motor source, for an error reset, or for an emergency stop. The operating data input-output part 213 also transmits them to controlling means 100.

Figure 14:
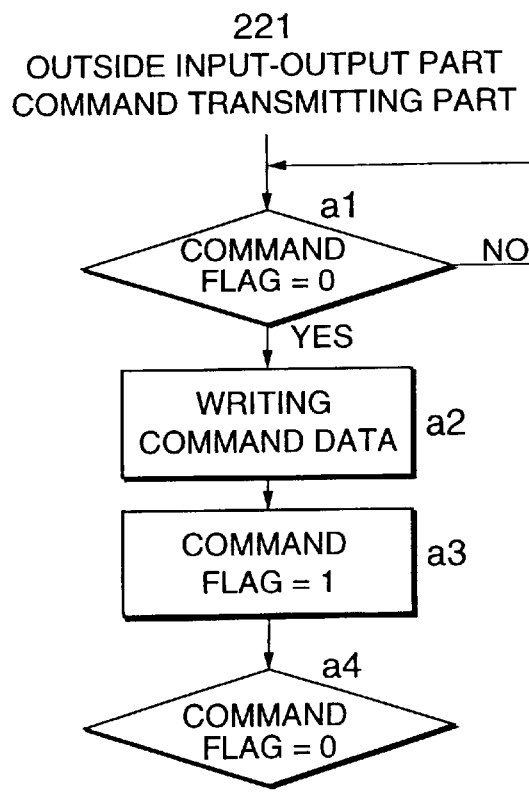
FIG. 14 is a flow chart for explaining the operation of the command transmitting element 221 of the outside command inputting and outputting element.
Figure 15:
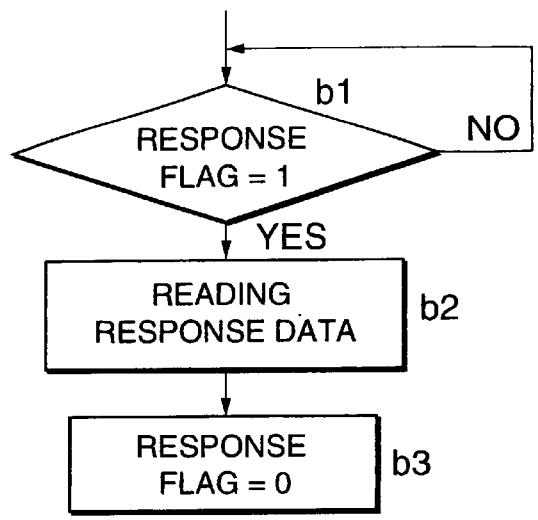
FIG. 15 is a flow chart for explaining the operation of the response receiving element 222 of the outside inputting and outputting element.
Figure 16:
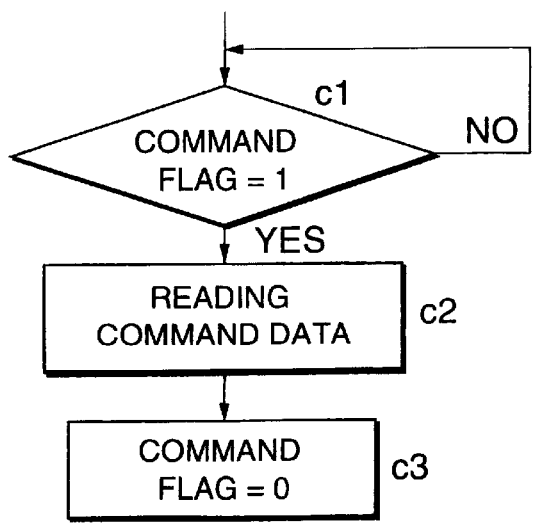
FIG. 16 is a flow chart for explaining the operation of the command receiving element 120 of the outside inputting and outputting element.
Figure 17:
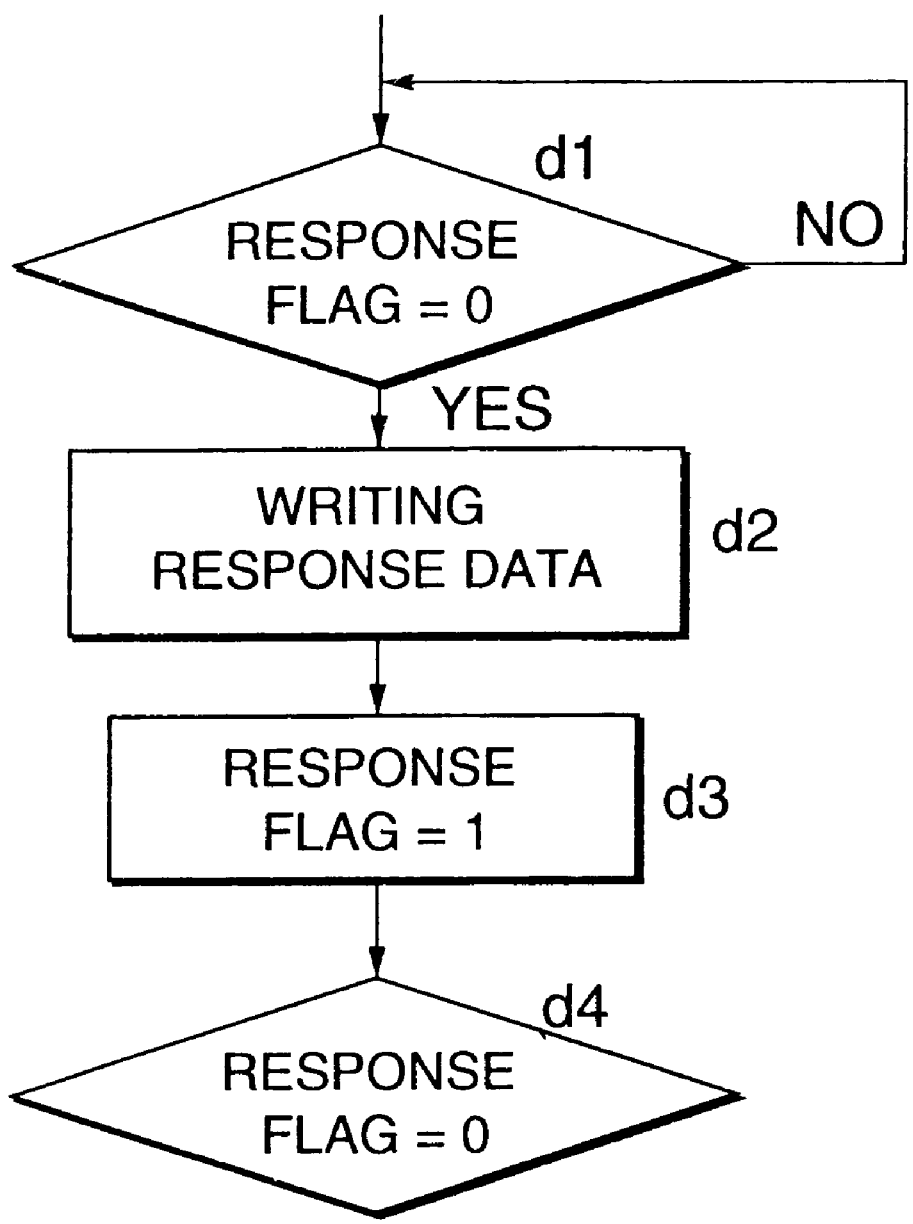
FIG. 17 is a flow chart for explaining the operation of the response transmitting element 121 of the outside inputting and outputting element.

FIG. 14 is a flow chart for explaining the operation of the command transmitting part 221 of the outside command input-output part. FIG. 15 is a flow chart for explaining the operation of the response receiving part 222 of the outside input-output part. FIG. 16 is a flow chart for explaining the operation of the command receiving part 120 of the outside input-output part. FIG. 17 is a flow chart for explaining the operation of the response transmitting part 121 of the outside input-output part.

As shown in FIGS. 14 and 16, command data are written into the common storage device 106 when the flag of the common storage device 106 is a logical "0", and then the flag is changed into a logical "1". Then, the command data are read out therefrom, and then the flag is changed back into the logical "0".

As shown in FIGS. 15 and 17, response data are read out from the common storage device 106 when the response flag is a logical "1", and then the response flag is changed into a logical "0". Then, the response data are written therein, and then the response flag is changed back into the logical "1". Therefore, the interference of the operations is avoided. That is, both of writing and reading the data into and from the common storage device 106 are surely carried out in turn.

According to the invention, the user can set any original application program in the robot control unit. Therefore, by operating the joints of the robot body, the unit can easily achieve various functions that are suitable for the user.

According to the invention, the construction of the unit is simple because the common storage device is used for both of the first and second processing circuits.

According to the invention, the first processing circuit in the controlling means can read out the instruction data from the common storage device, and then the second processing circuit in the operating means can write (store) the instruction data into the common storage device. Thus, the unit can easily achieve various functions that are suitable for a user.

According to the invention, the third processing circuit in the network operating means can write the instruction data into the common storage device in order to operate the robot body.

According to the invention, the detected data showing the moving state of the robot body can be written into the common storage device by the first processing circuit, and then be outputted on the displaying means connected to the second processing circuit. Thus, the moving state can be confirmed by the displaying means in a visual or auditory manner while the robot body is operated with the input means in the controlling means.

According to the invention, the moving state of the robot body operated following the instruction data inputted with the network inputting means can be outputted on the displaying means in the network operating means in a visual or auditory manner.

According to the invention, the servo units for the plural robot bodies are connected to the first processing circuit to drive the joints of the robot bodies, following the instruction data respectively for the robot bodies stored in the common storage device. In addition, the detected data of the robot bodies can be stored in the common storage device, and be outputted on the displaying means in the operating means or network operating means in a visual or auditory manner.

According to the invention, various instruction data can be inputted with the inputting means connected to the second processing circuit. The network inputting means in the network operating means may limit the instruction data to assure the safe operation for the robot body and to achieve the simple constitution.

According to the invention, the teaching data can be inputted and stored into the common storage device by the inputting means According to the invention, the teaching data inputted by the inputting means can be confirmed by the moving state of the robot body displayed on the displaying means. Thus, the error of the teaching data can be avoided.

According to the invention, the instruction data can be written into the common storage device, and be surely read out from the first processing circuit to the servo unit.

According to the invention, the detected data by the detected means can be written into the common storage device through the servo unit and the first processing circuit, be surely read out by the second processing circuit, and be displayed by the displaying means.

What is claimed is:

1. A robot control unit for controlling a robot body with a plurality of joints, comprising:
   a servo-unit for respectively driving the joints of the robot body, in response to an instructing signal;
   a common storage device for storing instruction data;
   a first processing circuit for reading the instruction data stored in the common storage device, and for sending the data to the servo-unit as the instructing signal;
   inputting means for making the instruction data for respectively driving the joints of the robot body by an inputting operation;
   a second processing circuit for causing the instruction data from the inputting means to be stored into the common storage device;
   a servo communication interface connected to the servo-unit,
   a first bus interface connected to the first processing circuit, and
   a second bus interface connected to the first bus interface, wherein:
      the first processing circuit reads the instruction data stored in the common storage device, and sends the data to the servo-unit as the instructing signal through the servo communication interface, and
      the second processing circuit causes the instruction data from the inputting means to be stored into the common storage device through the second bus interface and the first bus interface.

2. A robot control unit according to claim 1, further comprising:
   a first network communication interface connected to the second processing circuit, and
   network operating means having:
      network inputting means for making the instruction data for respectively driving the joints of the robot body by an inputting operation,
      a second network communication interface connected to the first network communication interface, and
      a third processing circuit for providing the instruction data from the network inputting means to the second processing circuit through the second network communication interface and the first network communication interface,
   wherein:
      the second processing circuit causes the instruction data from the first network communication interface to be stored into the common storage device through the second bus interface and the first bus interface.

3. A robot control unit according to claim 1, further comprising:
   detecting means for detecting a moving state of the robot body, and
   displaying means connected to the second processing circuit, for displaying detected data,
   wherein:
      the first processing circuit causes the detected data by the detecting means to be stored into the common storage device through the servo communication interface, and
      the second processing circuit reads the detected data stored in the common storage device through the first bus interface and the second bus interface, and causes them to be displayed by the displaying means.

4. A robot control unit according to claim 2, further comprising:
   detecting means for detecting a moving state of the robot body, and
   network displaying means connected to the third processing circuit, for displaying detected data,
   wherein:
      the first processing circuit causes the detected data by the detecting means to be stored into the common storage device through the servo communication interface,
      the second processing circuit reads the detected data stored in the common storage device through the first bus interface and the second bus interface, and
      the third processing circuit receives the detected data read by the second processing circuit through the first network communication interface and the second network communication interface, and causes them to be displayed by the network displaying means.

5. A robot control unit according to claim 1, wherein:
   the servo communication interface is connected to a plurality of servo units, and
   each of the servo units is separately connected to a robot body to drive it.

6. A robot control unit according to claim 1, wherein:
   the instruction data inputted by the inputting means include the instruction data inputted by the network inputting means and other data.

7. A robot control unit according to claim 1, wherein:
   teaching data can be inputted as the instruction data through the inputting means.

8. A robot control unit according to claim 3, wherein:
   teaching data can be inputted as the instruction data through the inputting means,
   the robot body can move following the teaching data when the teaching data is inputted, and
   the displaying means can display movement of the robot body following the inputted teaching data.

9. A robot control unit for controlling a robot body with a plurality of joints, comprising:
   a servo unit for respectively driving the joints of the robot body, in response to an instructing signal;
   a common storage device for storing instruction data;
   a first processing circuit for reading the instruction data stored in the common storage device, and for sending the data to the servo-unit as the instructing signal;
   inputting means for making the instruction data for respectively driving the joints of the robot body by an inputting operation;
   a second processing circuit for causing the instruction data from the inputting means to be stored into the common storage device, wherein:
      the common storage device has a binary flag area for the instruction data corresponding to the instruction data,
      the second processing circuit causes the instruction data to be stored into the common storage device when the binary flag area for the instruction data is a predetermined logical value, and then changes the predetermined logical value of the binary flag area for the instruction data into the other logical value thereof, and the first processing circuit reads the instruction data corresponding to the logical value of the binary flag area for the instruction data when the binary flag area for the instruction data is the other logical value, and then changes the other logical value of the binary flag area for the instruction data into the predetermined logical value thereof.

10. A robot control unit for controlling a robot body with a plurality of joints, comprising:

a servo-unit for respectively driving the joints of the robot body, in response to an instructing signal;

a common storage device for storing instruction data;

a first processing circuit for reading the instruction data stored in the common storage device, and for sending the data to the servo-unit as the instructing signal;

inputting means for making the instruction data for respectively driving the joints of the robot bode by an inputting operation;

a second processing circuit for causing the instruction data from the inputting means to be stored into the common storage device, wherein:

the common storage device has a binary flag area for the detection corresponding to the detected data, the second processing circuit causes the detected data to be stored into the common storage device when the binary flag area for the detection is a predetermined logical value, and then changes the predetermined logical value of the binary flag area for the detection into the other logical value thereof, and the first processing circuit reads the instruction data corresponding to the logical value of the binary flag area for the detection when the binary flag area for the detection is the other logical value, and then changes the other logical value of the binary flag area for the detection into the predetermined logical value thereof.

\* \* \* \* \*